US011355807B2

(12) United States Patent
Ballantine et al.

(10) Patent No.: US 11,355,807 B2
(45) Date of Patent: Jun. 7, 2022

(54) SHIPPABLE BATTERY MODULE AND METHOD

(71) Applicant: BLOOM ENERGY CORPORATION, San Jose, CA (US)

(72) Inventors: Arne Ballantine, Palo Alto, CA (US); Jessica Mahler, Palo Alto, CA (US); Ross Parker, Santa Clara, CA (US); Prasad Pmsvvsv, Sunnyvale, CA (US); Samuel Juday, Santa Clara, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 16/746,027

(22) Filed: Jan. 17, 2020

(65) Prior Publication Data

US 2021/0226186 A1 Jul. 22, 2021

(51) Int. Cl.

| | |
|---|---|
| ***H01M 12/00*** | (2006.01) |
| ***H01M 50/20*** | (2021.01) |
| ***H01M 16/00*** | (2006.01) |
| ***H01M 50/502*** | (2021.01) |

(52) U.S. Cl.

CPC ......... *H01M 50/20* (2021.01); *H01M 16/006* (2013.01); *H01M 50/502* (2021.01); *H01M 2220/10* (2013.01); *H01M 2250/10* (2013.01); *H01M 2250/402* (2013.01)

(58) Field of Classification Search

CPC .. H01M 50/20; H01M 50/202; H01M 50/204; H01M 50/502; H01M 50/505; H01M 50/507; H01M 16/006; H01M 2220/10; H01M 2250/10; H01M 2250/402

See application file for complete search history.

(56) References Cited

U.S. PATENT DOCUMENTS

| | | | | |
|---|---|---|---|---|
| 10,418,654 | B2 | 9/2019 | Trevisan et al. | |
| 2001/0053465 | A1* | 12/2001 | Fuglevand | H01M 8/0267 429/9 |
| 2016/0260996 | A1 | 9/2016 | Trevisan et al. | |
| 2019/0081290 | A1* | 3/2019 | Fauteux | H01M 10/425 |
| 2019/0140229 | A1* | 5/2019 | Lindstrom | H01M 50/20 |

FOREIGN PATENT DOCUMENTS

| | | |
|---|---|---|
| KR | 10-20170054100 A | 5/2017 |

OTHER PUBLICATIONS

Notification of Transmittal of the International Search Report and the Written Opinion of the International Searching Authority for International Patent Application No. PCT/US2021/013254, dated May 6, 2021, 10 pages.

* cited by examiner

*Primary Examiner* — Raymond Alejandro

(74) *Attorney, Agent, or Firm* — The Marbury Law Group PLLC

(57) ABSTRACT

A method of transporting a battery module includes transporting the battery module containing at least one battery and a backplane disposed in a cabinet to an operating site such that the at least one battery is electrically isolated from the backplane during the transporting, installing the battery module at the operating site, and electrically connecting the at least one battery to the backplane after the transporting.

7 Claims, 9 Drawing Sheets

100 132 104 120 124 125 105 106 106 122 D 130 102 126 20

SHIPPABLE BATTERY MODULE AND METHOD

FIELD

The present invention is directed generally to a shippable battery module and a method of shipping the same.

BACKGROUND

Currently, a variety of power generating applications that utilize battery modules to store and discharge substantial amounts of power. Typically, a battery module includes multiple batteries disposed in a battery cabinet, and corresponding electrical connections. However, batteries having a high power density, such as lithium ion batteries, have been known to combust in certain situations, such as if shorted and/or improperly discharged.

SUMMARY

According to various embodiments of the present disclosure, a battery module comprises a cabinet, a battery disposed in the cabinet, a backplane comprising at least one bus bar or connection circuitry, and electrical connections configured to electrically connect the battery to the backplane, the electrical connections each comprising a first terminal electrically connected to the battery and a second terminal electrically connected to the backplane and configured to electrically contact the first terminal to electrically connect the battery to the backplane in an operating position in the cabinet and to disconnect the battery from the backplane in a transport position in the cabinet.

According to various embodiments of the present disclosure, a method of transporting a battery module includes transporting the battery module containing at least one battery and a backplane disposed in a cabinet to an operating site such that the at least one battery is electrically isolated from the backplane during the transporting, installing the battery module at the operating site, and electrically connecting the at least one battery to the backplane after the transporting.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Battery Modules

High power density batteries are subject to various regulations during shipping. One such regulation requires that batteries be shipped in an electrically isolated state, such that damage during shipping will be less likely to generate a short circuit, thereby significantly reducing the potential of a battery-related fire.

Therefore, prior art batteries are shipped separately from a battery cabinet, and then the batteries are inserted into the cabinet and electrically connected at the operating site (i.e., at the site at which the batteries will be used to store and provide electrical power) using jumper wires. In other words, prior art battery modules require that jumper wires be installed and connected on site, which may lead to improper electrical connections.

Figure 1A:
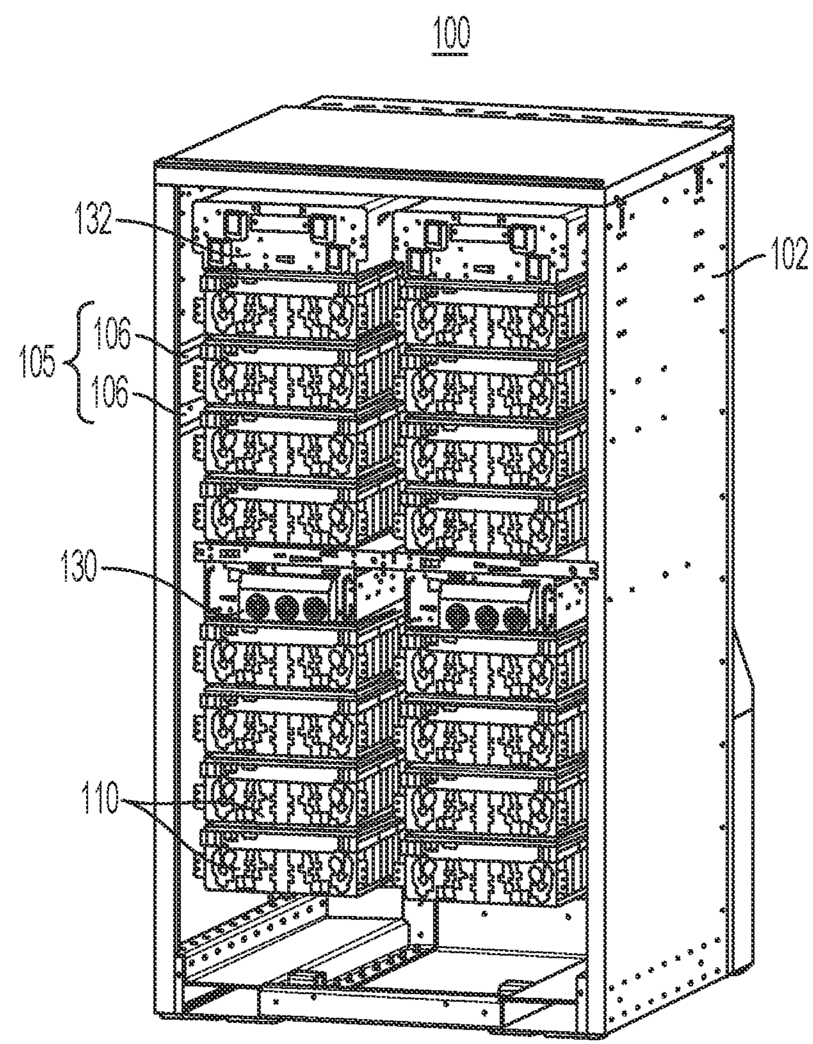
FIG. 1A is a partial perspective view of a battery module, according to various embodiments of the present disclosure.
Figure 1B:
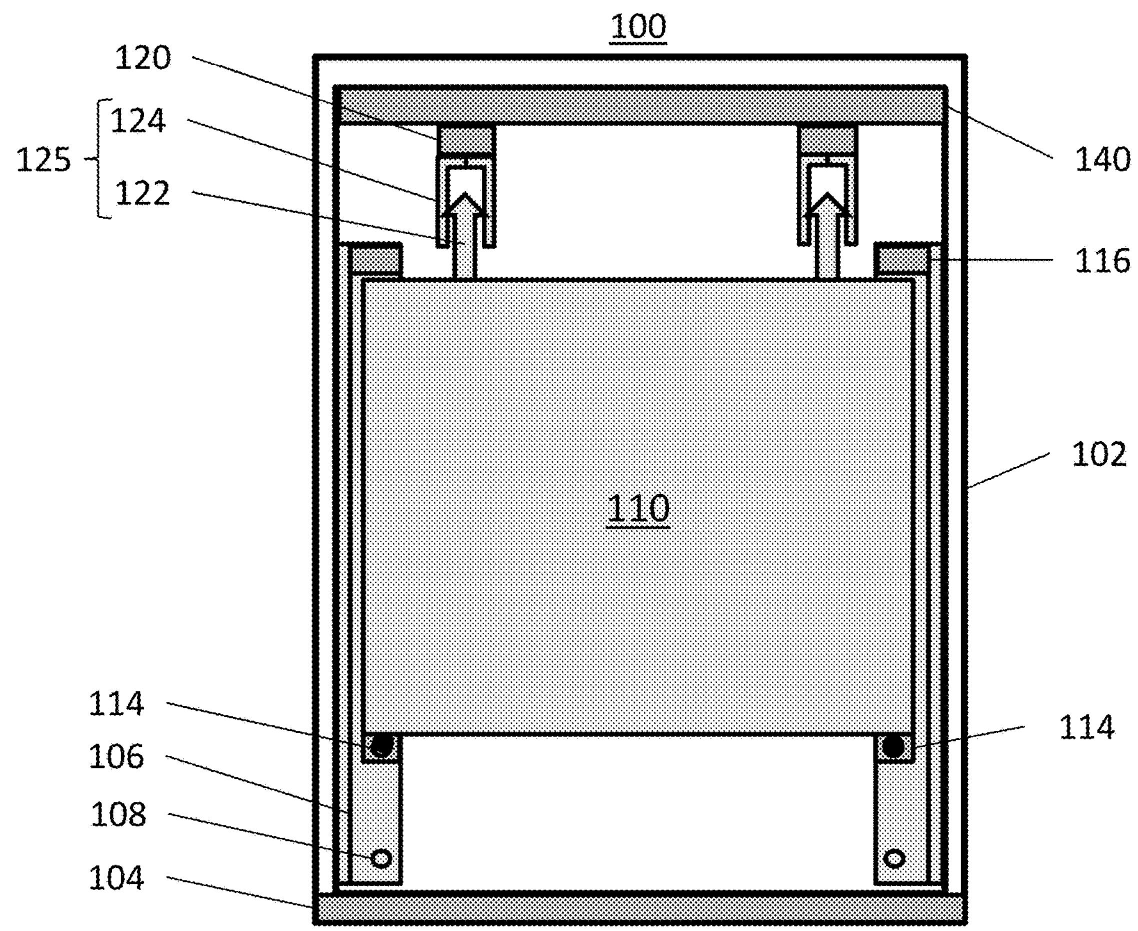
FIG. 1B is a top plan view including a battery of FIG. 1A, in an operating position.
Figure 1C:
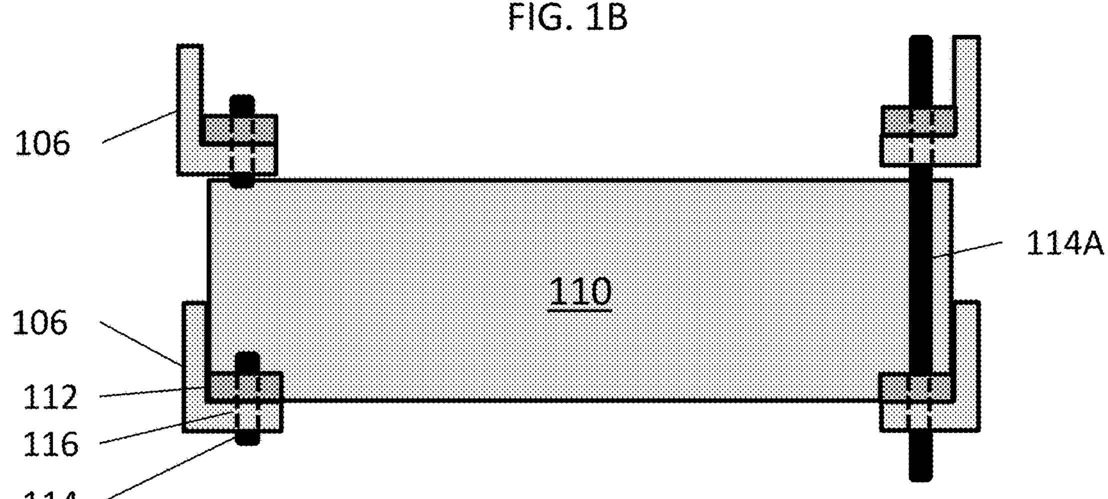
FIG. 1C is a front view of the battery of FIG. 1A.

FIG. 1A is a partial perspective view of a battery module 100, according to various embodiments of the present disclosure, and FIGS. 1B and 1C are respectively a top plan view and a front view of a battery 110 of the battery module 100 of FIG. 1A, in an operating position. Referring to FIGS. 1A-1C, the battery module 100 may include a cabinet 102 including a door 104 configured to provide access to the inside of the cabinet 102 and a number of batteries 110 disposed therein.

The batteries 110 may include one or more electrochemical cells. For example, the batteries 110 may include electrochemical cells having a high power density, such as lithium ion cells. However, the present disclosure is not limited to any particular type of electrochemical cell. The electrochemical cells of each battery 110 may be connected in parallel or series.

The cabinet 102 may include a battery rack 105 comprising alignment rails 106 configured to support the batteries 110. The alignment rails 106 may be configured to allow the batteries 110 to be moved between the operating position and a transport position within the cabinet 102. As shown in FIG. 1B, the alignment rails 106 above the batteries 110, such as alignment rails 106 supporting an adjacent battery 110, may further secure the batteries 110 in a vertical direction.

Figure 2A:
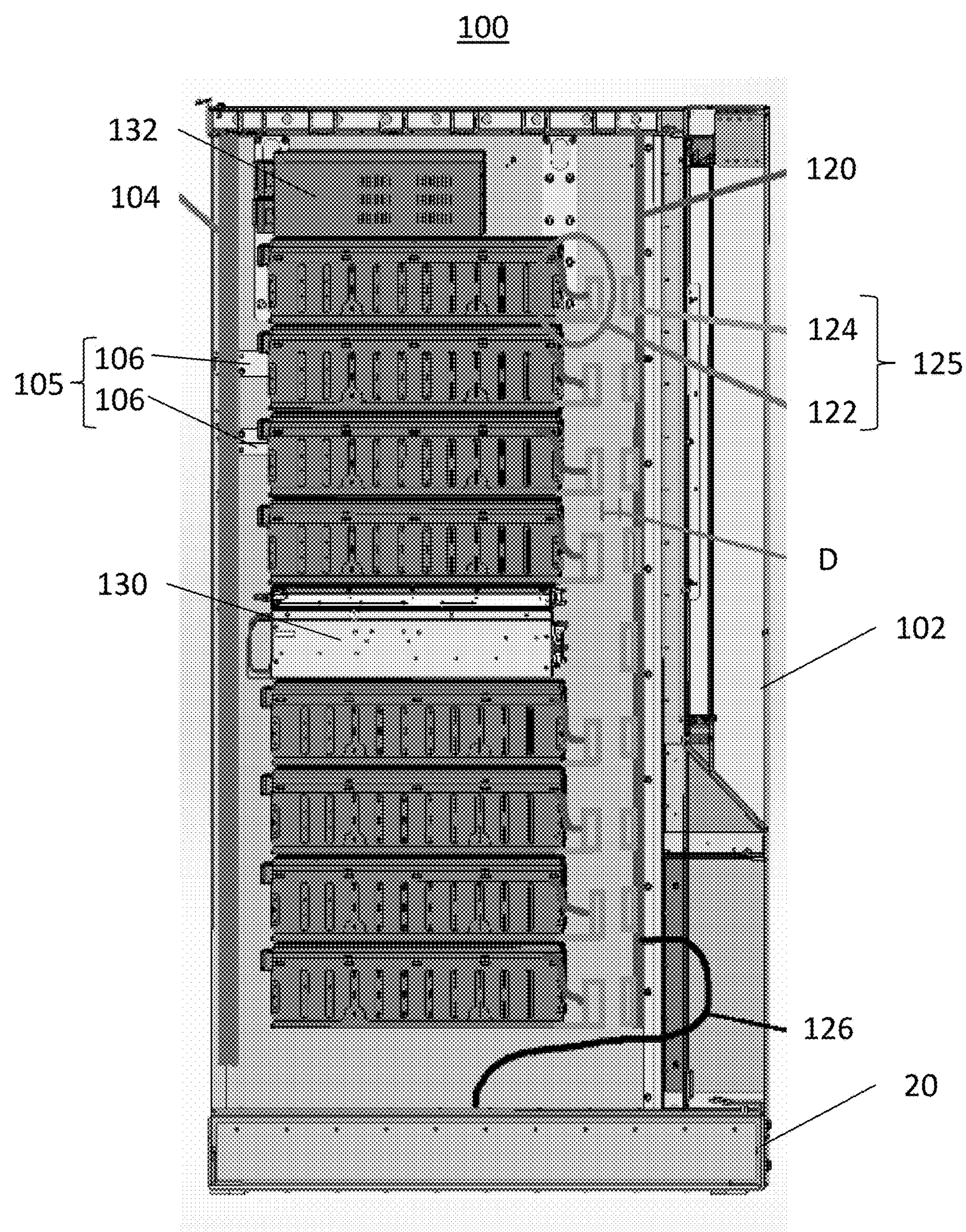
FIG. 2A is a partial sectional view of the battery module of FIG. 1A, in a transport configuration, FIG. 2B a top plan view including battery of FIG. 2A.

The battery module 100 may also include electrical connectors 125 and a backplane 140, which may include bus bars 120 and/or electrical connection circuitry. The backplane 140 may be fixed in the cabinet 102 in an operating position. The backplane 140 and/or bus bars 120 may be electrically connected to a power generating system using field connections 126 (e.g., conductive wires), as shown in FIG. 2A. In some embodiments, the field connections 126 may be configured to connect the battery module 100 to system bus bars 24 disposed in a pad 20 supporting the cabinet 102, as discussed below with regard to FIGS. 6 and 7 below.

As shown in FIG. 1B, the electrical connectors 125 may be configured to connect terminals of the batteries 110 to corresponding bus bars 120 or corresponding circuitry of the backplane 140. For example, the electrical connectors 125 may be configured to electrically connect positive terminals of the batteries 110 to one of the bus bars 120 (e.g., a positive bus bar), or to connect negative terminals of the batteries 110 to the other bus bar 125 (e.g., a negative bus bar). When the batteries 110 are electrically connected to the bus bars 120, the batteries 110 may be referred to as being in an operating position (e.g., the batteries 110 may be electrically charged and/or discharged to provide power to the backplane 140).

In some embodiments, the electrical connectors 125 may be blind mate connectors configured to establish an electrical connection, via a sliding or snapping action, without the use of tools such as a wrench. For example, each electrical connector 125 may include male terminal 122 and a female terminal 124 that are configured to be mate with one another when the battery 110 is moved into the operating position. As shown in FIG. 1B, the female terminals 124 may be attached to the bus lines 120 and/or backplane 140 and the male terminals 122 may be electrically connected to terminals of the batteries 110. However, these connections may be reversed in other embodiments. In some embodiments, male and female terminals 122, 124 may be attached to corresponding terminals of the batteries 110, and male and female terminals 122, 124 may be attached to the corresponding bus lines 120, such that the batteries 110 may only be connected to the bus bars 120 and/or backplane 140 when properly oriented in the cabinet 102.

The battery module 100 may also optionally include additional elements disposed within the cabinet 102, such as a cooling system 130 and/or an electronics module 132. For example, the cooling system 130 one or more fans configured to provide air into the cabinet 102 to cool elements disposed therein, such as the batteries 110. The electronics module 132 may include one or more power converters, such as DC/DC and/or AC/DC power converters, for example.

In some embodiments, the battery module 100 may optionally include locking elements, such as locking pins 114 or rods 114A, configured to lock the batteries 110 in the operating position as shown in FIGS. 1B and 1C. For example, the locking elements 114, 114A may extend through one or more optional locking apertures 116 formed in the rails 106. The rails 106 may optionally include additional locking apertures 108, as discussed below with regard to FIGS. 2A-2C. The rails 106 may optionally include end walls or barriers 116 configured to prevent the batteries 110 from moving past ends of the rails 106. Alternatively, the apertures 108 may be omitted and the locking elements 114, 114A are not used in the operating configuration. Instead, the terminals 122, 124 are used to lock the battery 110 in the operating position.

Figure 2B:
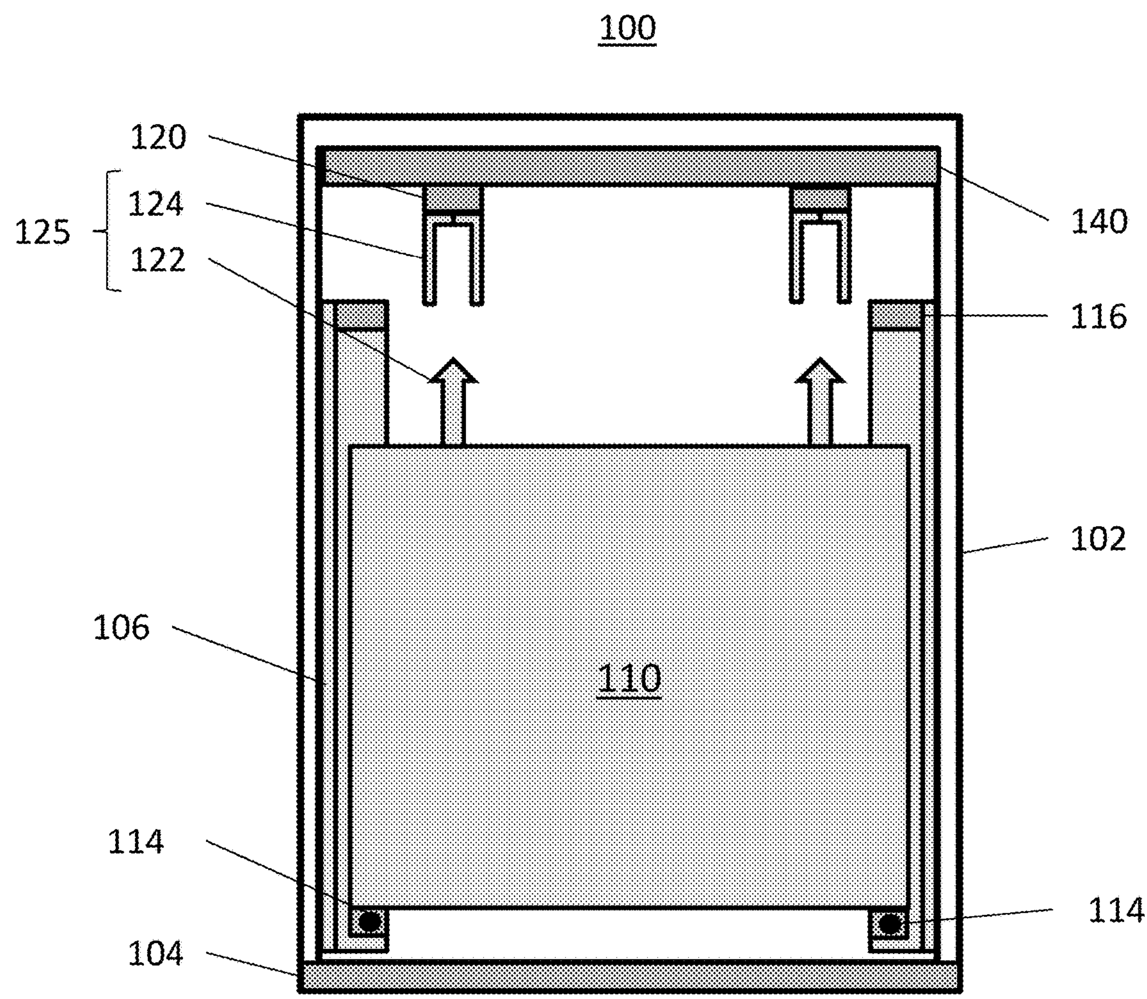
FIG. 2C is a front view of the battery of FIG. 2A.
Figure 2C:
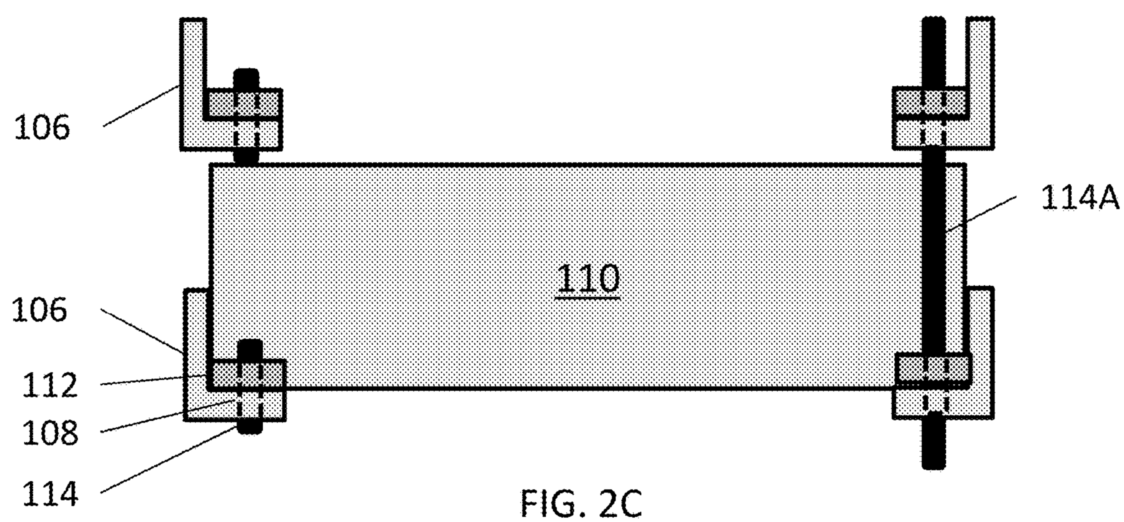

FIG. 2A is a partial side view of the battery module 100 of FIG. 1A, in a transport configuration, FIG. 2B a partial top plan view of the battery module 100 of FIG. 2A, and FIG. 2C is a front view of the battery 110 of FIG. 2A, in a transport position.

Referring to FIGS. 2A-2C, in the transport configuration, the batteries 110 may be disposed in the transport position, such that the male and female terminals 122, 124 are separated by a distance D. Distance D may be any distance sufficient to prevent the terminals 122, 124 from contacting one another during transporting (e.g., shipping) of the battery module 100. For example, distance D may range from about 2 cm to about 10 cm, such as from about 3 cm to about 8 cm, or from about 4 cm to about 6 cm. The transporting may include moving the battery module 100 to an operating site by truck, train, boat, plane, etc.

The batteries 110 may be locked in the transport position using any suitable locking mechanism. For example, the batteries 110 may include one or more locking tabs 112 configured to receive locking elements such as the locking pins 114 or rods 114A. The locking elements 114, 114A may be configured to extend through the locking tabs 112 and the rails 106, via locking apertures 108 formed in the rails 106 and the locking tabs 112. Any suitable type of locking pin 114 or bar 114A may be used, such as a cotter pin, spring clip, nut and bolt, or the like. Accordingly, the batteries 110 may be locked in the transport position, so as to remain electrically isolated (i.e., electrically disconnected from the backplane 140) during transport to the operating site.

In other embodiments, as shown in FIG. 2B, one or more locking bars 114A may optionally be used in place of the locking pins 114, to lock multiple batteries 110 in the transport position. For example, the locking bar 114A may extend through the tabs 112 of plural batteries, e.g., of some or all of the batteries 110.

According to various embodiments of the present disclosure, the batteries 110 may be individually moved between the transport and operating positions (e.g., by being moved back toward the backplane into the operating position once installed at the operating site). In other embodiments, entire battery rack 105 containing battery supports, such as the rails 106 supporting some or all of the batteries 110 may be moved between the operating and transport positions, and/or secured with one or more locking elements 114, 114B. The battery rack 105 supporting the batteries 110 may be moved on wheels, coasters, rails or other suitable implements inside the cabinet 102 toward the backplane 140 in the operating position and away from the backplane 140 in the transport position.

Figure 3A:
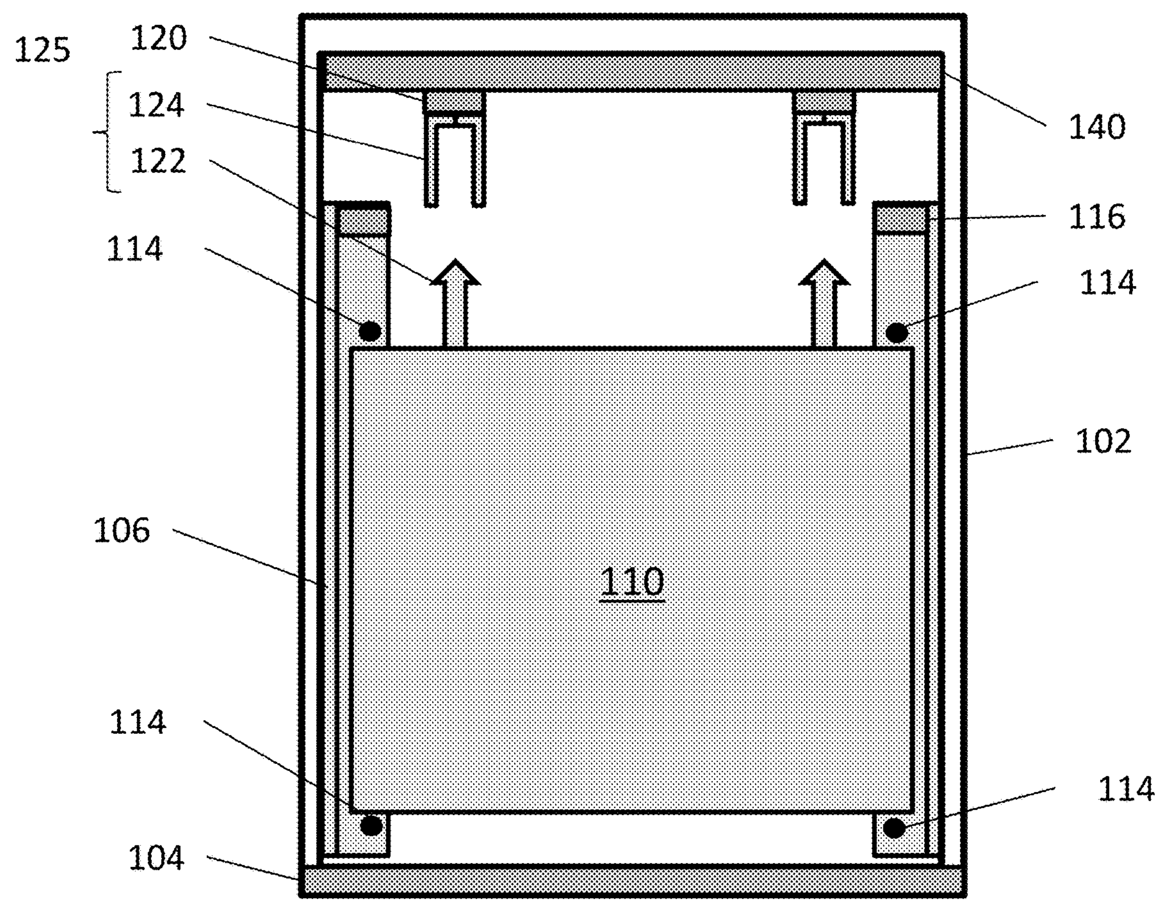
FIG. 3A a plan view of a portion of the battery module of FIG. 2A, including a modified locking mechanism.
Figure 3B:
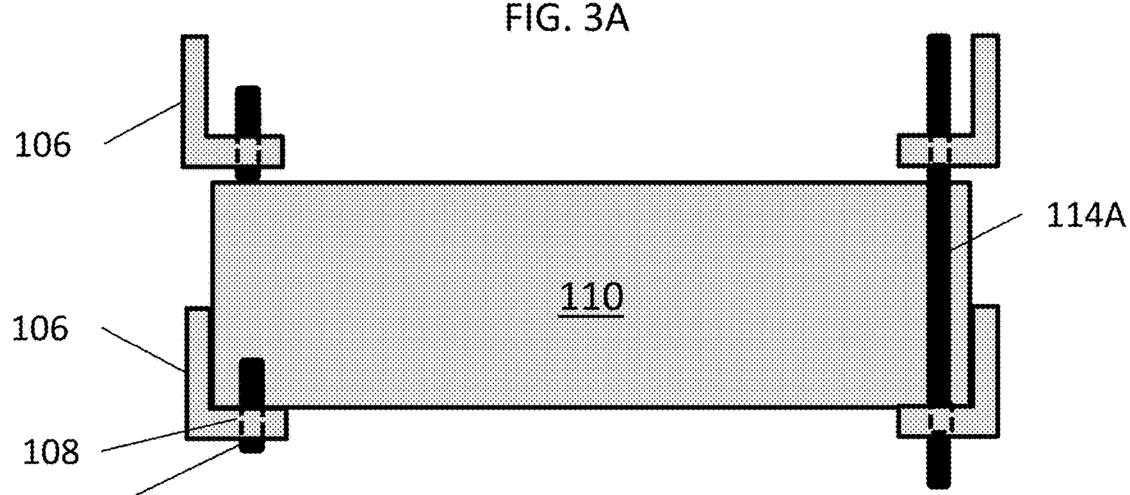
FIG. 3B is a front view including a battery of FIG. 3A.

FIG. 3A a plan view of a portion of the battery module 100 of FIG. 2A, including a modified locking mechanism, and FIG. 3B is a front view showing a battery of FIG. 3A, in a transport position. Referring to FIGS. 3A and 3B, two or more locking elements 114, 114A may be disposed on opposing sides of the batteries 110, in order to lock the battery 110 in the transport position. In particular, the locking tabs 112 of FIGS. 2A and 2B may be omitted, and two locking elements 114, 114A may be disposed in one of the rails 106, or in both of the rails 106 supporting each battery 110, to control lateral movement of the batteries 110.

As shown on the right side of FIG. 3B, the locking bars 114A may extend vertically through multiple rails 106 may be used to secure the batteries 110, in place of the locking pins 114, which extend through only a single rail 106, as shown in the left side of FIG. 3B. For example, a first locking bar 114A may extend through the rails 106 and be disposed adjacent to the electrical connectors 125, and a second locking bar 114A may extend through the rails 106 and be disposed adjacent to the door 104.

Figure 4A:
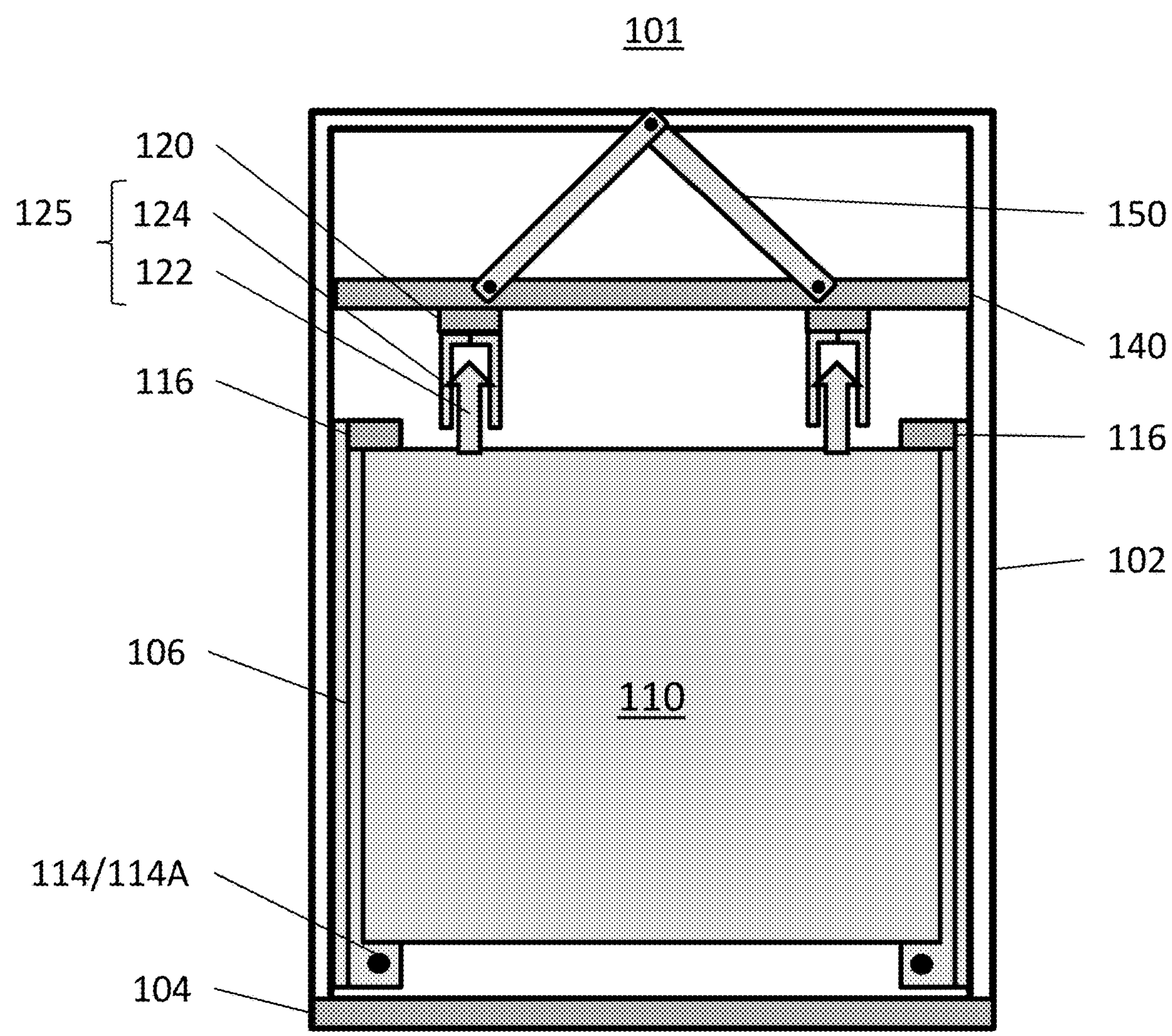
FIG. 4A is a top plan view of another battery module in an operating configuration, according to various embodiments of the present disclosure.
Figure 4B:
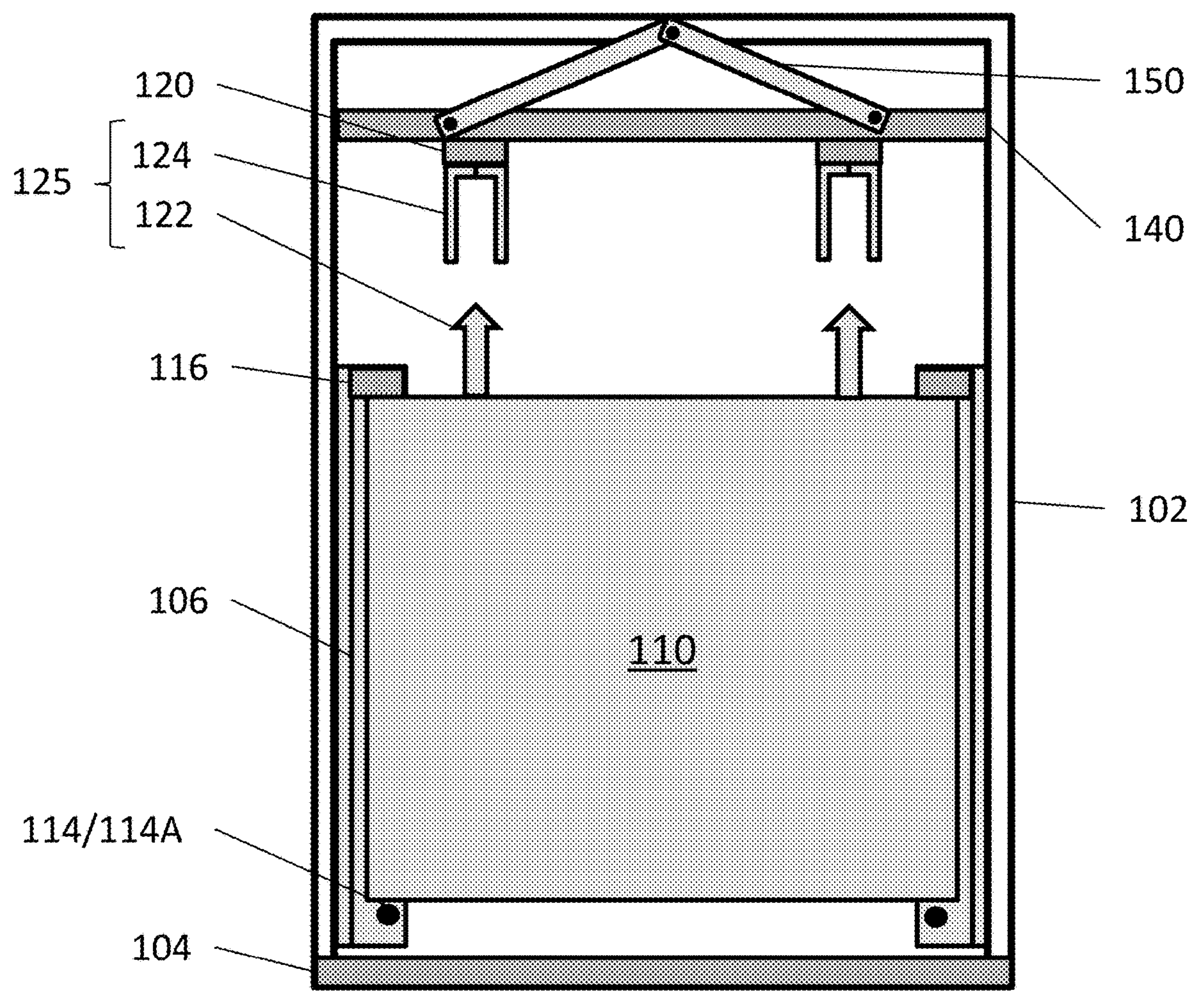
FIG. 4B is a top plan view of the battery module of FIG. 4A, in a transport configuration.

FIG. 4A is a top plan view of another battery module 101 in an operating configuration, according to various embodiments of the present disclosure. FIG. 4B is a top plan view of the battery module 101 of FIG. 4A, in a transport configuration. The battery module 101 is similar to the battery module 100 of FIGS. 1A-1C, so only the differences therebetween will be discussed in detail.

Referring to FIGS. 4A and 4B, the battery module 101 may include the backplane 140 upon which the electrical connectors 125 are disposed, and a locking mechanism comprising a lockable linkage 150. The backplane 140 may be moveable within the cabinet 102. The backplane 140 may include the bus bars 120 and/or electrical circuitry connected to the electrical connectors 125.

The linkage 150 may be configured to move the backplane 140 between an operating position, as shown in FIG. 4A, and a transport position, as shown in FIG. 4B. The linkage 150 may also be configured to lock the backplane 140 in the transport and/or operating positions. The linkage 150 may be manually operated from outside of the cabinet 102, in some embodiments, or may be actuated by a motor. In an alternative embodiment, both the backplane 140 and the batteries 110 and/or battery rack 105 may be moved toward each other.

The rails 106 of the battery module 101 may include the end walls or barriers 116 configured to hold the batteries 110 in an operating position at the end of the rails 106. The battery module 101 may further include one or more of the locking elements 114, 114A, which may be configured to prevent the batteries 110 from moving towards the door 104 during transport, for example. Since the batteries 110 may be electrically connected and disconnected by the movement of the backplane 140, the batteries may remain in the operating position when electrically isolated.

Figure 5A:
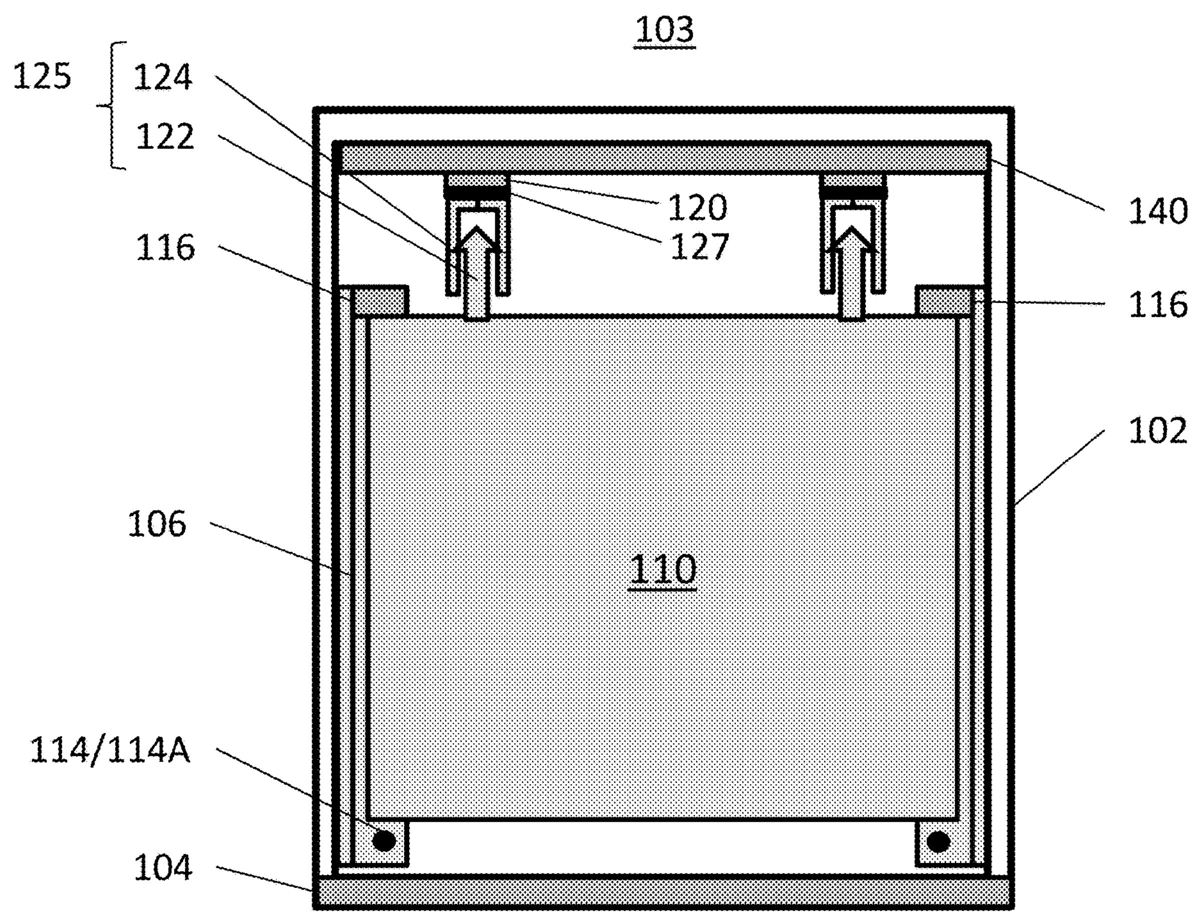
FIG. 5A is a top plan view of another battery module, according to various embodiments of the present disclosure.
Figure 5B:
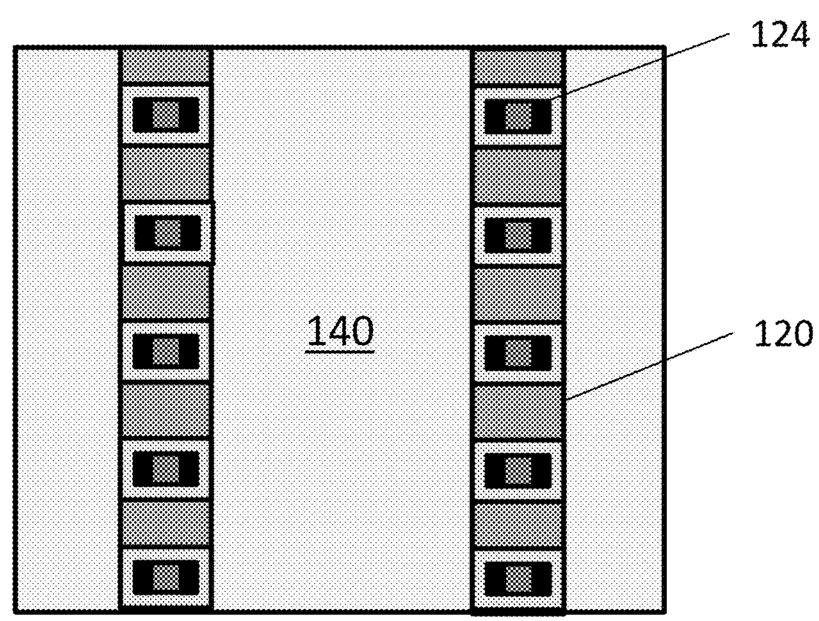
FIG. 5B is a plan view of a backplane of the the battery module of FIG. 5A.

FIG. 5A is a top plan view of another battery module 103, according to various embodiments of the present disclosure. FIG. 5B is a plan view of a backplane 140 of the battery module 103 of FIG. 5A. The battery module 103 is similar to the battery module 100 of FIGS. 1A-1C, so only the differences therebetween will be discussed in detail.

Referring to FIGS. 5A and 5B, the batteries 110 may be disposed in the same position in both a transport and operating configuration. In other words, the terminals 122, 124 may be connected in both the transport and operating configurations.

However, the backplane 140 includes contactors 127 (e.g., relays) disposed between the terminal 124 and the rest of the backplane 140 (e.g., between the terminal 124 and the field connection(s) 126 or between the terminal 124 and the bus bar 120). In the transport configuration, the contactors 127 may be open, such that the batteries 110 are electrically isolated from the rest of the backplane 124. In the operating configuration, the contactors 127 may be closed, such that the batteries are electrically connected to the rest of the backplane 140 (e.g., to the field connection(s) 126). The contactors 127 may be open and closed by sending an electrical control signal through the bus bars 20 from controller located on the backplane 140 or from an external controller that is electrically connected to the backplane during the opening and closing of the contactors 127.

Battery Module Shipping Methods

According to various embodiments of the present disclosure, a method of shipping any battery module as described above is provided. The method may comprise inserting batteries into the cabinet of the battery module, such that the battery module is in a transport configuration. In the transport configuration, the batteries may be disposed in a transport position on the battery rack, or the rack itself may be disposed in the transport position, or the batteries may be disposed on the battery rack in an operating position and a backplane of the battery module may be in a transport position. In particular, in the transport configuration, the batteries, or a rack containing the batteries, may be partially inserted into the cabinet, so as to be disposed in the transport position to electrically isolate the batteries. In the alternative, in the transport configuration, the batteries or rack of batteries may be completely inserted into the rack or into the battery module cabinet, respectively, so as to be in the operating position, while the backplane of the battery module is disposed in a transport position (i.e., retracted from the batteries and/or the rack) that electrically isolates the batteries. In a further alternative, in the transport configuration, the batteries or rack of batteries may be completely inserted such that electrical terminals electrically connect the batteries to the backplane, and electrical contactors of the backplane may be open to electrically isolate the batteries. In the operating configuration, the electrical contactors may be closed.

The method may then include locking the batteries (or the rack of batteries) in the transport position, and/or locking the backplane in the transport position. In other embodiments, the batteries or rack of batteries may be disposed in the operating position, and electrical contacts of the backplane may be opened, in the transport configuration. Subsequently, the battery module may be shipped to the operating site. After shipping, the method may include electrically connecting the batteries to bus bars and/or circuitry of the backplane. For example, the batteries may be individually moved in the rack toward the backplane or the rack of batteries may be moved toward the backplane from the transport position to the operating position, such that the terminals of electrical the connectors contact one another and establish an electrical connection between the backplane and the batteries. In the alternative embodiment, the backplane may be moved to an operating position, such that the terminals of electrical the connectors contact one another and establish an electrical connection to the batteries. In a further alternative embodiment, the terminals of the electrical connectors may be connected to each other in both the transport and the operating positions. However, the contactors in the backplane are open in the transport position and closed in the operating position, without moving the batteries, the rack of batteries or the backplane between the transport and operating positions.

The method may then include electrically connecting the backplane to system bus lines, such as system bus lines of a fuel cell system as described below. However, the battery module may be connected to any power generating system, such as a solar cell system, a wind turbine system, a power grid, or the like. The electrical connection may be established using field connections, wires, or the like.

Accordingly, the method allows for a battery module to be shipped with module batteries disposed inside the system cabinet, while being electrically isolated from one another and other elements of the battery module. Further method allows for the battery module to be shipped with in-place battery wiring, which reduces the chance of improperly installed battery connections and the need for such wiring to be separately supplied at the site of operation.

Power Systems

The battery modules described above may be used in conjunction with any power system, as described above. In some embodiments, one or more of the battery modules may be used in conjunction with a fuel cell power system.

Figure 6:
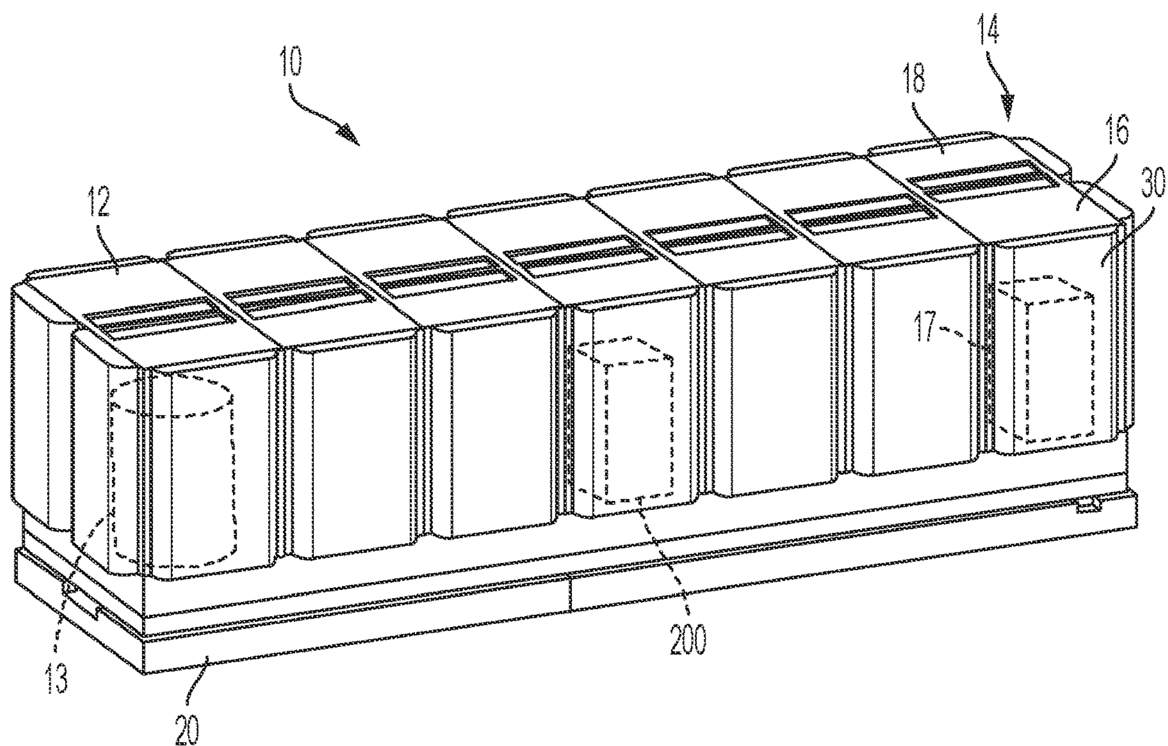
FIG. 6 is a perspective view of a modular fuel cell system, according to various embodiments of the present disclosure.
Figure 7:
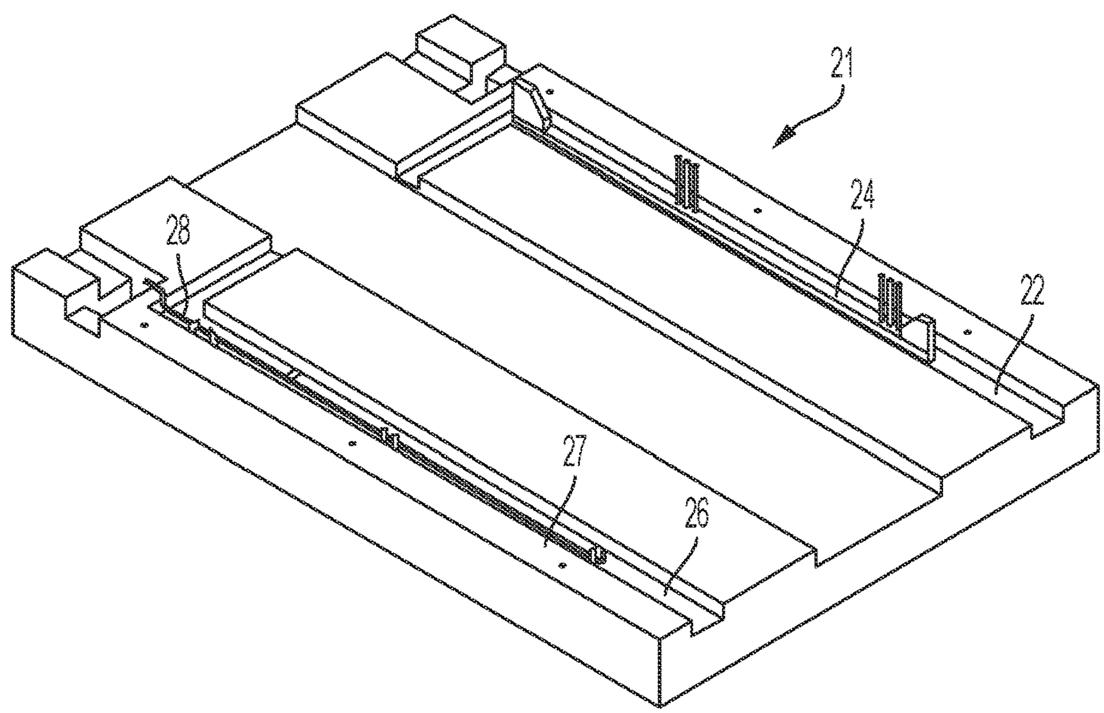
FIG. 7 is a perspective view of a portion of a base of the system of FIG. 6.

FIG. 6 is a perspective view of a modular fuel cell system 10, according to various embodiments of the present disclosure. FIG. 7 is a perspective view of a portion of a base 20 of the system 10 of FIG. 6. Referring to FIGS. 6 and 7, the system 10 may contain a power module 12, a fuel input (i.e., fuel processing) module 16, a conditioning (i.e., electrical output) module 18, and a battery module 200. The system 10 may be disposed on a pre-cast base or pad 20. The battery module 200 may be any of the battery modules described above and may be disposed in any location in the system 10. In other embodiments, the battery module 200 may be disposed on a separate pad from the remaining modules of the system 10 and may be electrically connected thereto by additional wiring.

In some embodiments, the power conditioning modules 18 are configured to deliver direct current (DC). In alternative embodiments, the power conditioning modules 18 are configured to deliver alternating current (AC). In these embodiments, the power condition modules include a mechanism to convert DC to AC, such as an inverter. For example, the system 10 may include any desired number of modules, such as 2-30 power modules, for example 3-12 power modules, such as 6-12 modules. FIG. 6 illustrates a system 10 containing five power modules 12 (one row of five modules stacked side to side), one fuel processing module 16, one battery module 200, and one power conditioning module 18 on a common base 20. Each module 12, 16, 18, 200 may comprise its own cabinet. Alternatively, modules 16 and 18 may be combined into a single input/output module 14 located in one cabinet. While one row of power modules 12 is shown, the system may comprise more than one row of modules 12. For example, the system may comprise two rows of power modules arranged back to back/end to end.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The fuel cell stacks may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

The fuel processing module 16 contains the components used for pre-processing of fuel, such as adsorption beds (e.g., desulfurizer and/or other impurity adsorption) beds. The fuel processing module 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may process at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

The battery module 200 may be configured to store power generated by the power modules 12, and/or may be configured to apply stored power to a load connected to the system 10. As described above, the system 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the battery module 200 may supplement the power output of the system 10 when one or more of the power modules 12 are taken off line, or when the power load exceeds the maximum power output of the power modules 12.

Thus, in a system comprising a plurality of modules, each of the modules 12, 14, 16, 18, or 200 may be electrically disconnected, removed from the system 10 and/or serviced or repaired without stopping an operation of the other modules in the system 10, allowing the system 10 to continue to generate electricity. The entire system 10 does not have to be shut down if one stack of fuel cells in one hot box 13 malfunctions or is taken off line for servicing.

Referring now to FIG. 7, a section 21 of the pad 20 is shown according to an exemplary embodiment, which provides a mounting and support surface for the system 10. In one embodiment, two or more such pre-cast sections 21 are joined to form the base 20 that supports the modules of the system 10.

According to an exemplary embodiment, the base 20 is formed to include channels (e.g. trenches, depressions, slots, etc.) to receive electrical system bus bars 24, input and output fuel conduits 27 and water conduit(s) 28 to and from the system and/or between the modules. A first channel 22 houses the system bus bar 24, which provides bus connections to the power modules 12, input/output module(s) 14, and battery module 200. The system bus bar 24 may be a laminated bus bar with a segmented design or a section of a cable. A second channel 26 houses the header for fuel supply conduit 27 and the header for the water supply conduit 28. By providing the bus bar 24 and fluid conduits 27, 28 in channels in the base 20, the system 10 protects these components from the weather. Additional channels may be formed in the base 20 to house other components, such as communication lines, or to provide water drainage features to ensure water is directed as desired for good system integration. Further, the first and second channels 22, 26 and other features of the base 20 may be formed in a mirrored configuration. In this manner, the system can be assembled with plural power modules 12 in a mirrored configuration, simplifying assembly and maintenance. In an alternative embodiment, the battery module 200 may be located on a separate base from the base 20 and then electrically connected to the fuel system located on the base 20 using wires or cables.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

The invention claimed is:

1. A battery module, comprising:

a cabinet;

a battery disposed in the cabinet and comprising a first terminal;

a battery rack disposed in the cabinet and configured to support the battery in a transport position and in an operating position;

a backplane comprising a second terminal and at least one bus bar or connection circuitry electrically connected to the second terminal; and a locking mechanism configured to lock the battery in the transport position on the battery rack, such that the battery is prevented from moving to the operating position, wherein:

when the battery is in the operating position, the first terminal is configured to contact the second terminal to electrically connect the battery to the backplane, and when the battery is in the transport position, the first terminal is configured to be separated from the second terminal by a distance to electrically.

2. The battery module of claim 1, wherein:

the battery comprises a locking tab; and the locking mechanism comprises a locking pin configured to extend through the locking tab and a rail of the battery rack, to lock the battery in the transport position.

3. The battery module claim 1, wherein:

the battery module comprises a plurality of batteries that comprise locking tabs; and the locking mechanism comprises locking pins configured to extend through the locking tabs of each battery and rails of the battery rack, to lock the batteries in the transport position.

4. The battery module of claim 1, wherein:

the battery module comprises a plurality of batteries; and the locking mechanism comprises a locking bar configured to lock the batteries in the battery rack.

5. The battery module of claim 1, further comprising an electrical contactor located between the second terminal and the backplane and configured to selectively electrically connect the battery to the backplane, when the battery is in the operating position.

6. The battery module of claim 1, wherein:

the first terminal and the second terminal are blind mate electrical connections; and when the battery is in the transport position, the distance between the first connector and the second connector ranges from about 2 cm to about 10 cm.

7. A modular fuel cell system comprising the battery module of claim 1 and fuel cell power modules.

* * * * *